(12) United States Patent
Arnold et al.

(10) Patent No.: US 8,990,500 B2
(45) Date of Patent: *Mar. 24, 2015

(54) STORING THE MOST SIGNIFICANT AND THE LEAST SIGNIFICANT BYTES OF CHARACTERS AT NON-CONTIGUOUS ADDRESSES

(71) Applicant: International Business Machines Corporation, Armonk, NY (US)

(72) Inventors: Jeremy A. Arnold, Rochester, MN (US); Scott A. Moore, Rochester, MN (US); Gregory A. Olson, Rochester, MN (US); Eric J. Stec, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 116 days.

This patent is subject to a terminal disclaimer.

(21) Appl. No.: 13/766,133

(22) Filed: Feb. 13, 2013

(65) Prior Publication Data

US 2013/0159624 A1 Jun. 20, 2013

Related U.S. Application Data

(63) Continuation of application No. 12/861,863, filed on Aug. 24, 2010, now Pat. No. 8,402,221.

(51) Int. Cl.
  *G06F 13/00* (2006.01)
  *G06F 13/28* (2006.01)
  *G06F 12/08* (2006.01)
  *G06F 9/30* (2006.01)
  *G06F 9/455* (2006.01)
  *G06F 12/00* (2006.01)

(52) U.S. Cl.
  CPC ........ *G06F 12/0802* (2013.01); *G06F 9/30018* (2013.01); *G06F 9/30043* (2013.01); *G06F 12/0877* (2013.01); *G06F 9/45508* (2013.01); *G06F 12/00* (2013.01)
  USPC ...................... 711/118; 711/E12.017; 341/87

(58) Field of Classification Search
  USPC .............................. 711/118, E12.017; 341/87
  See application file for complete search history.

(56) References Cited

U.S. PATENT DOCUMENTS 6,166,666 A * 12/2000 Kadyk ............................. 341/87
6,751,790 B2   6/2004 Sokolov et al.
8,402,221 B2 * 3/2013 Arnold et al. ................. 711/118

OTHER PUBLICATIONS

Craig Zilles, "Accordian Arrays: Selective Compression of Unicode Arrays in Java," ISMM '07, Oct. 21-22, 2007, pp. 1-12, ACM, Montreal, Quebec, Canada.

* cited by examiner

*Primary Examiner* — Edward Dudek, Jr.
(74) *Attorney, Agent, or Firm* — Owen J. Gamon; James R. Nock

(57) ABSTRACT

In an embodiment, an indicator is set to indicate that all of a plurality of most significant bytes of characters in a character array are zero. A first index and an input character are received. The input character comprises a first most significant byte and a first least significant byte. The first most significant byte is stored at a first storage location and the first least significant byte is stored at a second storage location, wherein the first storage location and the second storage location have non-contiguous addresses. If the first most significant byte does not equal zero, the indicator is set to indicate that at least one of a plurality of most significant bytes of the characters in the character array is non-zero. The character array comprises the first most significant byte and the first least significant byte.

14 Claims, 6 Drawing Sheets

STORING THE MOST SIGNIFICANT AND THE LEAST SIGNIFICANT BYTES OF CHARACTERS AT NON-CONTIGUOUS ADDRESSES

CROSS REFERENCE TO RELATED APPLICATIONS

This is a continuation application of U.S. patent application Ser. No. 12/861,863, filed Aug. 24, 2010, to Jeremy A. Arnold, et al., entitled "STORING THE MOST SIGNIFICANT AND THE LEAST SIGNIFICANT BYTES OF CHARACTERS AT NON-CONTIGUOUS ADDRESSES," which is herein incorporated by reference.

FIELD

An embodiment of the invention generally relates to computer systems and more particularly to computer programs that access character data.

BACKGROUND

Computer systems typically comprise a combination of computer programs and hardware, such as semiconductors, transistors, chips, circuit boards, storage devices, and processors. The computer programs are stored in the storage devices and are executed by the processors. Fundamentally, computer systems are used for the storage, manipulation, and analysis of data.

One type of data is character data. A character is a unit of information, a grapheme, or a symbol that represents or controls data. Characters have a physical appearance, called a glyph, when displayed on a display device or printed via a printer. Examples of characters include letters, numerals, and punctuation marks. Characters may also include control characters, which describe the formatting of other characters. Examples of control characters include carriage return and tab.

Characters are often encoded or represented in a computer system as numbers, which are typically stored in memory as a byte (8 bits), two bytes (16 bits), or a variable number of bytes. These numbers are called code points. Many mappings of characters to code points exist, which are called coded character sets. Examples of coded character sets include the American Standard Code for Information Interchange (ASCII), the Extended Binary Coded Decimal Interchange Code (EBCDIC), the 16-bit Unicode Transformation Format (UTF-16), and the International Organization for Standardization (ISO) 8859-1.

SUMMARY

A computer-readable storage medium and computer system are provided. In an embodiment, an indicator is set to indicate that all of a plurality of most significant bytes of characters in a character array are zero. A first index and an input character are received. The input character comprises a first most significant byte and a first least significant byte. The first most significant byte is stored at a first storage location and the first least significant byte is stored at a second storage location, wherein the first storage location and the second storage location have non-contiguous addresses. If the first most significant byte does not equal zero, the indicator is set to indicate that at least one of a plurality of most significant bytes of the characters in the character array is non-zero. The character array comprise the first most significant byte and the first least significant byte. In an embodiment, the first storage location of the first most significant byte is in a first cache line in a cache and the second storage location of the first least significant byte is in a second cache line in the cache, wherein the first cache line is different from the second cache line.

It is to be noted, however, that the appended drawings illustrate only example embodiments of the invention, and are therefore not considered a limitation of the scope of other embodiments of the invention.

DETAILED DESCRIPTION

Figure 1:
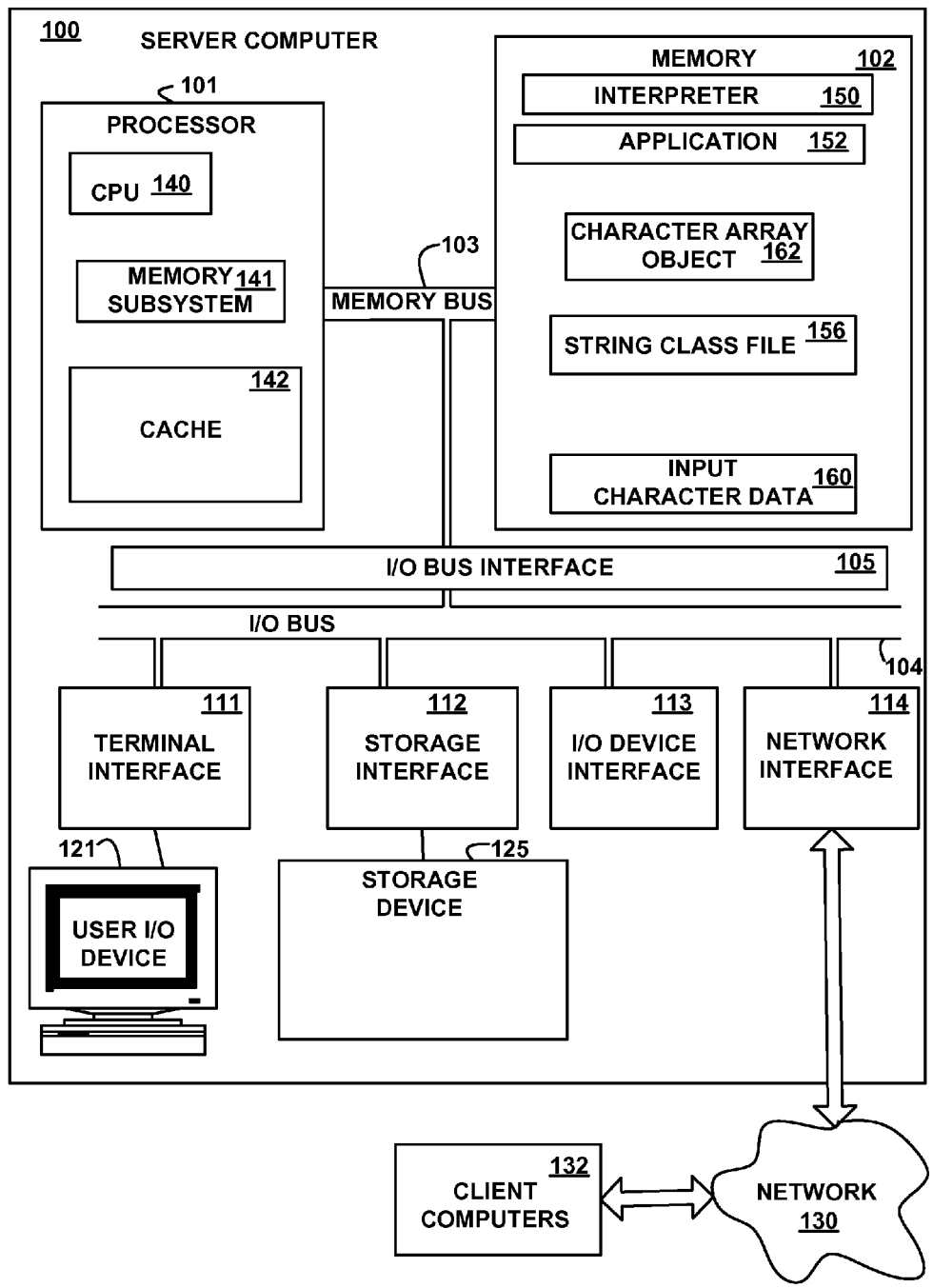
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to client computer systems 132 via a network 130, according to an embodiment of the invention. In various embodiments, a computer system that acts as a server in one scenario may act as a client in another scenario, and vice versa. The major components of the computer system 100 include one or more processors 101, memory 102, a terminal interface unit 111, a storage interface unit 112, an I/O (Input/Output) device interface unit 113, and a network adapter 114, all of which are communicatively coupled, directly or indirectly, for inter-component communication via a memory bus 103, an I/O bus 104, and an I/O bus interface unit 105.

The processor 101 comprises one or more general-purpose programmable central processing units (CPUs) 140, a memory subsystem 141, and a cache 142. In an embodiment, the computer system 100 contains multiple processors typical of a relatively large system; however, in another embodiment the computer system 100 may alternatively be a single processor system. The CPU 140 executes instructions stored in the memory 102 and/or the cache 142.

The cache 142 comprises a random access semiconductor memory. In an embodiment, the cache 142 is smaller in size and faster than the memory 102 and stores copies of a subset of the data and/or instructions from the memory 102. In various embodiments, cache 142 may be implemented as multiple independent caches, such as an instruction cache that stores executable instructions, a data cache that stores data, and a translation look aside buffer that the CPU 140 uses to perform virtual-to-physical address translation for both executable instructions and data. The memory subsystem 141 reads data from the memory 102 via the memory bus 103 into the cache 142 and data from the cache 142 to the memory 102.

The memory 102 may be a random-access semiconductor memory, storage device, or storage medium for storing or encoding data and programs. In another embodiment, the memory 102 may represent the entire virtual memory of the computer system 100, and may also include the virtual memory of other computer systems coupled to the computer system 100 or connected via the network 130. The memory 102 is conceptually a single monolithic entity, but in other embodiments the memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 stores or encodes an interpreter 150, an application 152, a character array object 162, a string class file 156, and input character data 160. Although the interpreter 150, the application 152, the character array object 162, the string class file 156, and the input character data 160 are illustrated as being contained within the memory 102 in the computer system 100, in other embodiments some or all of them may be on different computer systems (e.g., the client computers 132) and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the interpreter 150, the application 152, the character array object 162, the string class file 156, and the input character data 160 are illustrated as being contained within the memory 102, these elements are not necessarily all completely contained in the same storage device at the same time. Further, although the interpreter 150, the application 152, the character array object 162, the string class file 156, and the input character data 160 are illustrated as being separate entities, in other embodiments some of them, portions of some of them, or all of them may be packaged together.

In various embodiments, the memory subsystem 141, the interpreter 150, the application 152, and the string class file 156 comprise programs, functions, methods, procedures, routines, classes, objects, instructions, or statements that execute on the processor 101 or that are interpreted by instructions or statements that execute on the processor 101, or that are compiled into instructions that execute on the processor 101, to carry out the functions as further described below with reference to FIGS. 2, 3, 4, 5, 6, and 7. In other embodiments, some or all of the memory subsystem 141, the interpreter 150, the application 152, and the string class file 156 are implemented in hardware via semiconductor devices, chips, logical gates, circuits, circuit cards, and/or other physical hardware devices in lieu of, or in addition to, a processor-based system.

In various embodiments, the application 152 may be a user application, a third-party application, an operating system, a function or operation, or any portion, multiple, or combination thereof.

The character array object 162 represents one or more characters and is created or instantiated by the string class file 156 from the input character data 160. In other embodiments, the character array object 162 may be instantiated from any appropriate class, such as a string class, a string buffer class, or a string builder class. In other embodiments, character and string data may be implemented with any appropriate data structure, such as an array, and objects and object oriented programming techniques are not necessary.

In an embodiment, each character in the character array object 162 is stored in two bytes of data, which are non-contiguous, i.e., the storage locations of the two bytes are not adjacent to each other, or the addresses of the storage locations of the two bytes are not sequential. In an embodiment, the input character data 160 is stored in two bytes of data, which are contiguous, i.e., the storage locations of the two bytes of a character in the input character data 160 are adjacent to each other, or the addresses of the storage locations of the two bytes are sequential.

The memory bus 103 provides a data communication path for transferring data between the processor 101, the memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user input/output devices 121, which may include user output devices (such as a video display device, speaker, printer, and/or television set) and user input devices (such as a keyboard, mouse, keypad, touchpad, trackball, buttons, light pen, or other pointing device). A user may manipulate the user input devices, in order to provide input to the user input/output device 121 and the computer system 100 via a user interface, and may receive output via the user output devices. For example, a user interface may be presented via the user input/output device 121, such as displayed on a display device, played via a speaker, or printed via a printer.

The storage interface unit 112 supports the attachment of one or more direct access storage devices 125 (which are typically rotating magnetic disk drive storage devices, although they could alternatively be other devices, including arrays of disk drives configured to appear as a single large storage device to a host). In another embodiment, the storage devices 125 may be implemented via any type of secondary storage device. The contents of the memory 102, or any portion thereof, may be stored to and retrieved from the storage devices 125, as needed.

The I/O device interface 113 provides an interface to any of various other input/output devices or devices of other types, such as printers or fax machines. The network adapter 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path between the processors 101, the memory 102, and the I/O bus interface unit 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 may be a multi-user mainframe computer system, a single-user system, or a server or similar device that has little or no direct user interface, but receives requests from other computer systems (clients). In other embodiments, the computer system 100 may be implemented as a desktop computer, portable computer, laptop or notebook computer, tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support wireless communications. In another embodiment, the network 130 may support hard-wired communications, such as a telephone line or cable. In an embodiment, the network 130 may be the Internet and may support IP (Internet Protocol). In various embodiments, the network 130 may be a local area network (LAN), a wide area network (WAN), a hotspot service provider network, an intranet, a GPRS (General Packet Radio Service) network, a FRS (Family Radio Service) network, a cellular data network, or a cell-based radio network. Although one network 130 is shown, in other embodiments any number of networks (of the same or different types) may be present.

The client computers 132 may comprise various combinations of some or all of the hardware and program components of the computer system 100.

FIG. 1 is intended to depict the representative major components of the computer system 100, the network 130, and the client computers 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations.

The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs." The computer programs comprise one or more instructions or statements that are resident at various times in various memory and storage devices in the computer system 100 and that, when read and executed by one or more processors in the computer system 100 or when interpreted by instructions that are executed by one or more processors, cause the computer system 100 to perform the actions necessary to execute steps or elements comprising the various aspects of embodiments of the invention.

Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency (RF), or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the present invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks. The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the present invention may also be delivered as part of a service engagement with a client corporation, nonprofit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature.

The exemplary environments illustrated in FIG. 1 are not intended to limit the present invention. Indeed, other alternative hardware and/or program environments may be used without departing from the scope of embodiments the invention.

Figure 2:
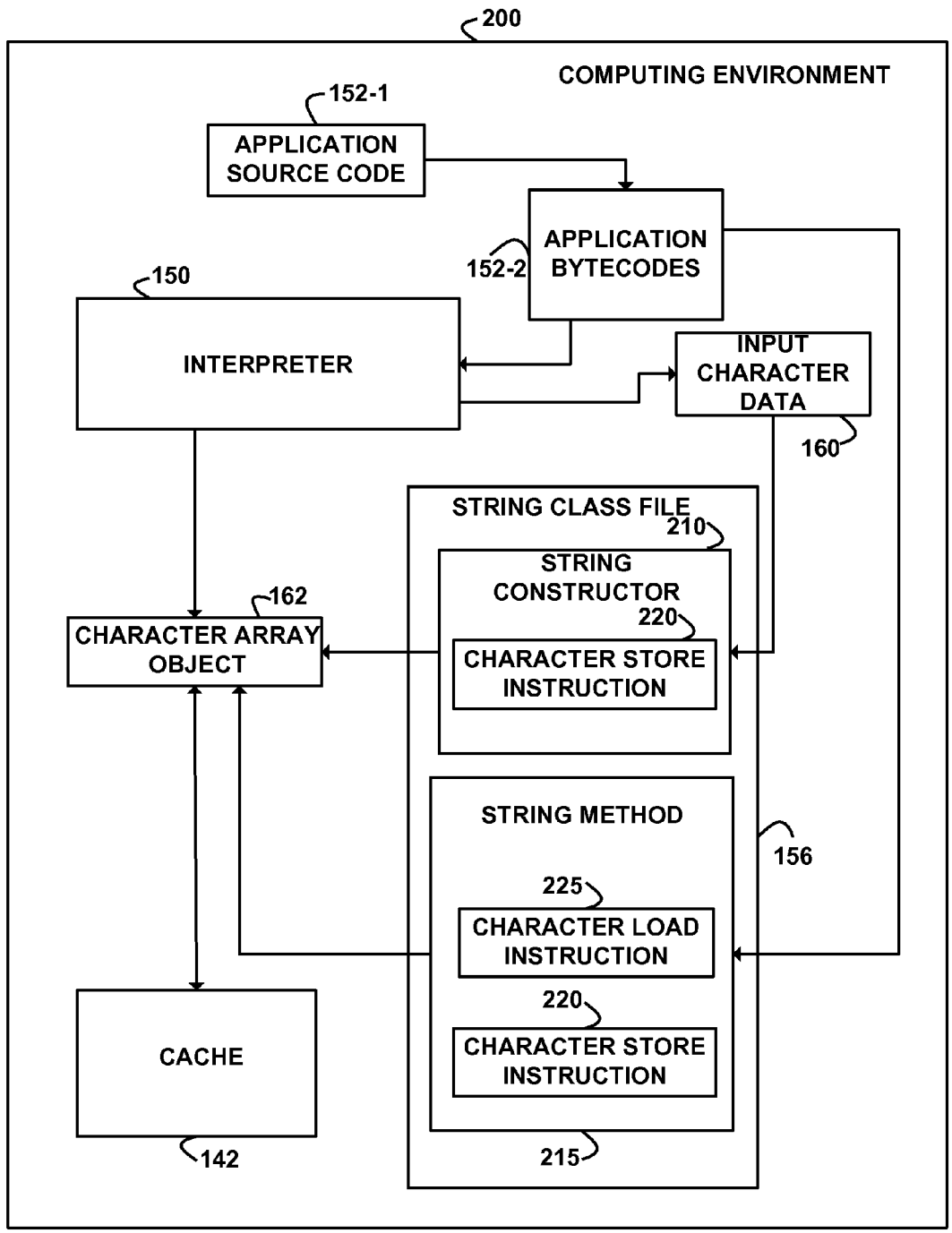
FIG. 2 depicts a block diagram of selected components of an embodiment of the invention.

FIG. 2 depicts a block diagram of selected components of a computing environment 200, according to an embodiment of the invention. The computing environment 200 comprises a cache 142, an interpreter 150, application source code 152-1, application bytecodes 152-2, a string class file 156, input character data 160, and a character array object 162. The application source code 152-1 and the application bytecodes 152-2 are versions of the application 152 and are generically referred to by the application 152 (FIG. 1).

In an embodiment, the string class file 156 and the application bytecodes 152-2 execute on the processor 101 or are interpreted by the interpreter 150 that executes on the processor 101 to carry out the functions as further described below with reference to FIGS. 2, 3, 4, 5, 6, and 7. In various embodiments, the functions of the interpreter 150 may be implemented by a compiler or by an interpreter in conjunction with a just-in-time (JIT) compiler. In an embodiment, the application source code 152-1 is input to a compiler, which compiles the application source code 152-1 into the application bytecodes 152-2.

The string class file 156 may comprise one or more string constructors 210 that instantiate the character array object 162 and store the input character data 160 into the character array object 162. The string constructor 210 receives the input character data 160 from the execution of the application bytecodes 152-2.

The string constructor 210 instantiates or creates the character array object 162 using an invocation of the character store instruction 220. Although the invocation of the character store instruction 220 is illustrated within the string constructor 210, the instructions, statements, or method that implements the character store instruction 220 may be contained within the character array object 162 or otherwise separate from the string constructor 210.

The string class file 156 further comprises one or more string methods 215, comprising invocations of a character store instruction 220 and/or a character load instruction 225. The string methods 215 may perform one or more operations on the character array objects 162. Examples of the string methods 215 include compare, concatenation, contains, find, join, left, length, partition, reverse, substring, uppercase, lowercase, or any other appropriate operation, function, or method that performs actions on a character array object 162. Although the invocation of the character store instruction 220 and the character load instruction 225 are illustrated within the string method 215, the instructions, statements, or methods that implement the character store instruction 220 and the character load instruction 225 may be contained within the character array object 162 or otherwise separate from the string method 215.

As the character store instruction 220 and the character load instruction 225 execute on the processor 101, the memory subsystem 141 (FIG. 1) reads portions of the character array object 162 into the cache 142, and the character store instruction 220 and the character load instruction 225 write and read the character array object 162 via the cache 142.

Figure 3:
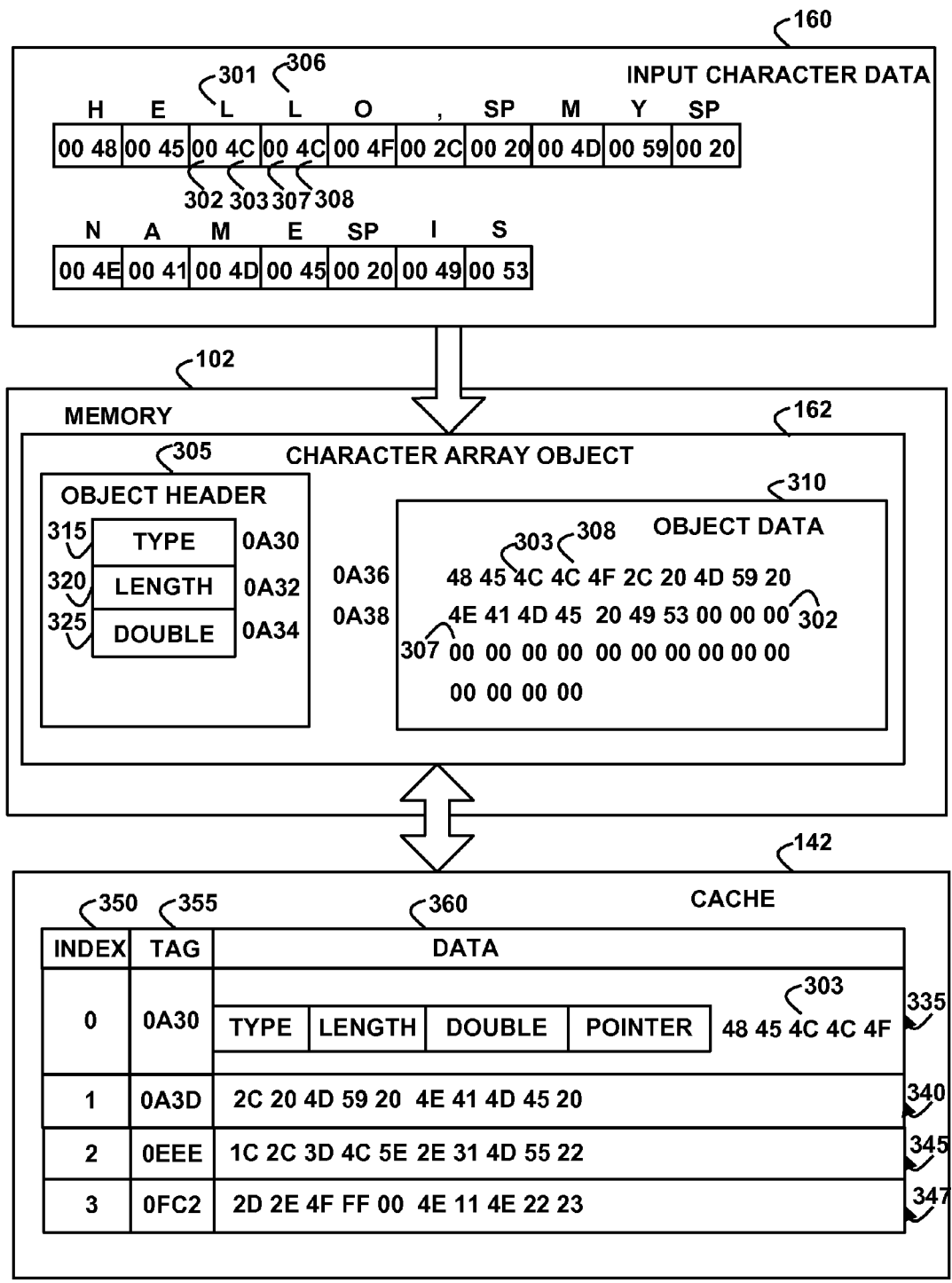
FIG. 3 depicts a block diagram of the relationship of input character data, a character array object, and a cache, according to an embodiment of the invention.

FIG. 3 depicts a block diagram of the relationship of the input character data 160, the character array object 162 and the cache 142, according to an embodiment of the invention.

The input character data 160 comprises an array of entries, each entry comprising two bytes of data that represent a character. Each entry comprises a high byte or most significant byte (MSB) and a low byte or least significant byte (LSB) of the digits represented by the two bytes of the entry. The MSB and the LSB that together represent a character are stored in contiguous memory locations within the input character data 160. For example, the character "L" 301 is represented by a MSB 302 of "00" and a LSB 303 of "4C." The MSB 302 "00" and the LSB "4C" are contiguous, meaning that they are stored in adjacent memory locations, i.e., memory locations whose addresses are sequential.

The terms "high," "low," "most significant," and "least significant" refer to the value of the place or location within the two-byte character data, using positional notation. Positional notation or place-value notation is a method of representing or encoding numbers using exponentiation of a base, wherein a digit's value is the digit multiplied by the value of its place. Place values are the number of the base raised to the nth power, where n is the number of other digits between a given digit and the radix point. The base is the number of unique digits, including zero, that the positional numeral system uses to represent numbers. The highest symbol of a positional numeral system has the value one less than the value of the base of that numeral system.

The example data of FIG. 3 is illustrated in the hexadecimal system, which uses a base of sixteen and the sixteen digits or numerals of 0 through 9 and A through F. Thus, for example, the character "L" 301 is encoded as "004C," the meaning of which (in decimal notation) is $(0\times16^3)+(0\times16^2)+(4\times16^1)+(12\times16^0)$, where $16^3$, $16^2$, $16^1$ and $16^0$ are the values of the places or locations of the digits. The MSB 302 is most significant in the data representing the character 301 because the MSB 302 comprises the locations or positions within the number (that encodes the character 301 of "L") whose exponents of the base are largest, and the LSB 303 is least significant in the number (that encodes the character 301) because the LSB 303 comprises the locations or positions within the number whose exponents of the base are smallest. (The "3" and "2" exponents, representing the locations in the MSB 302, are larger than the "1" and "0" exponents, representing the locations in the LSB 303).

The character array object 162 in the memory 102 comprises an object header 305 and object data 310. The string constructor 210 (FIG. 2) allocates and creates the character array object 162 from the input character data 160. The string constructor 210 stores the MSB and the LSB of each character of the input character data 160 into the object data 310 of the character array object 162 in non-contiguous storage locations, using the character store instruction 220. For example, the string constructor 210 stores the character "L" 301 into the object data 310 as the MSB 302 and the LSB 303, which are non contiguous in the object data 310. Similarly, the string constructor 210 stores the character 306 from the input character data 160 into the object data 310 as the MSB 307 and the LSB 308, which are non-contiguous in the object data 310. The MSB 302 and the MSB 307, which were non-contiguous in the input character data 160 are contiguous in the object data 310. The LSB 303 and 308, which were non-contiguous in the input character data 160 are contiguous in the object data 310.

The string constructor 210 further creates the object header 305 of the character array object 162. The object header 305 comprises a type field 315, a length field 320, and a double field 325. The type field 315 identifies the data in the object data 310 as character data. In an embodiment, the length field 320 specifies the character length of the object data 310 in terms of the number of characters, with each character using two bytes (a respective MSB and a respective LSB). Thus, the character length of the object data 310 is the number of bytes in the object data of the character array divided by two. In another embodiment, the length field 320 specifies the length of the object data 310 in terms of the number of bytes in the object data 310. In other embodiments, the length field 320 may be expressed in any units, and the characters may be represented by any number of bytes or using any amount of memory.

The double field 325 is an indicator that specifies whether all characters in the object data 310 have zeros in their MSB or whether at least one character in the object 310 has a non-zero value in its MSB. In an embodiment, the string constructor 210 sets the double field 325 to indicate true if at least one character in the object data 310 has a non-zero value in its MSB and sets the double field 325 to indicate false if all characters in the object data 310 have zeros in their MSB.

The cache 142 comprises cache lines, such as the example cache lines 335, 340, 345, and 347. Each cache line 335, 340, 345, and 347 comprises an index field 350, a tag field 355, and a data field 360. The size of the data in the data field 360 is the size or amount of data that the memory subsystem 141 requests from the memory 102 at one time. In an embodiment, the size of each data field 360 in each cache line is larger than the size of the amount of data requested by a CPU instruction. The index field 350 in each cache line comprises a unique number or identifier that refers to, identifies, or is the address of that cache line. The tag field 355 in each cache line comprises the address in the memory 102 of the data 360 that is stored in that cache line.

The cache 142 in FIG. 3 illustrates that the LSB 303 of the character 301 is in the cache line 335, but the MSB 302 of the character 301 is not in either the cache line 335 or the cache line 340, which is a different cache line from the cache line 335. In another embodiment, the MSB 302 is in one of the cache lines in the cache 142. In various embodiments, the MSB 302 is not in the cache 142 at a time when the LSB 303 is in the cache 142 because the CPU 140 did not request the MSB 302 or data in the same cache line as the MSB 302 or because the MSB 302 was previously in the cache 142, but the memory subsystem 141 evicted the MSB 302 in response to a replacement policy.

When an instruction executing on the CPU 140 needs to read from or write to a location in the memory 102, the CPU 140 (or the memory subsystem 141) checks whether a copy of the data at that location is in the cache 142 by comparing the address of the memory location to all tags 355 in the cache 142 whose cache line might contain the address. If the CPU 140 (or the memory subsystem 141) finds that the memory location is in the cache 142, then a cache hit has occurred; otherwise, a cache miss has occurred. For a cache hit, the CPU 140 reads/writes the data from/to the cache line in the cache 142 instead of reading/writing the data from/to the memory 102.

For a cache miss, the CPU 140 (or the memory subsystem 141) copies the data from the memory 102 to a cache line in the cache 142 and then reads or writes from/to the cache 142, in the same manner as for a cache hit. If the cache 142 does not have an available cache line, the memory subsystem 141 evicts an existing cache line from the cache, writes the data in the cache line to memory 102 (if the data has been modified since it was last read from the memory 102) and replaces the evicted data with a cache line comprising data from the memory 102 that was requested by the CPU 140.

The heuristic that the memory subsystem 141 uses to select the cache line to evict is called the replacement policy or the eviction policy. In various embodiments, the memory subsystem 141 may use a Least Recently Used (LRU) heuristic, a Most Recently Used (MRU) heuristic, a Least Frequently Used (LFU) heuristic, an Adaptive Replacement Cache (ARC) heuristic, a Time to Live (TTL) heuristic, or any other appropriate heuristic.

Thus, if character data spans multiple cache lines, in an embodiment, the memory subsystem 141 does not necessarily need to read the most significant byte of a character into the cache if the double field 325 indicates false, meaning that all of the most significant bytes in the characters of the character data are zero, which causes the character load instruction to not access the most significant byte of a character.

Figure 4:
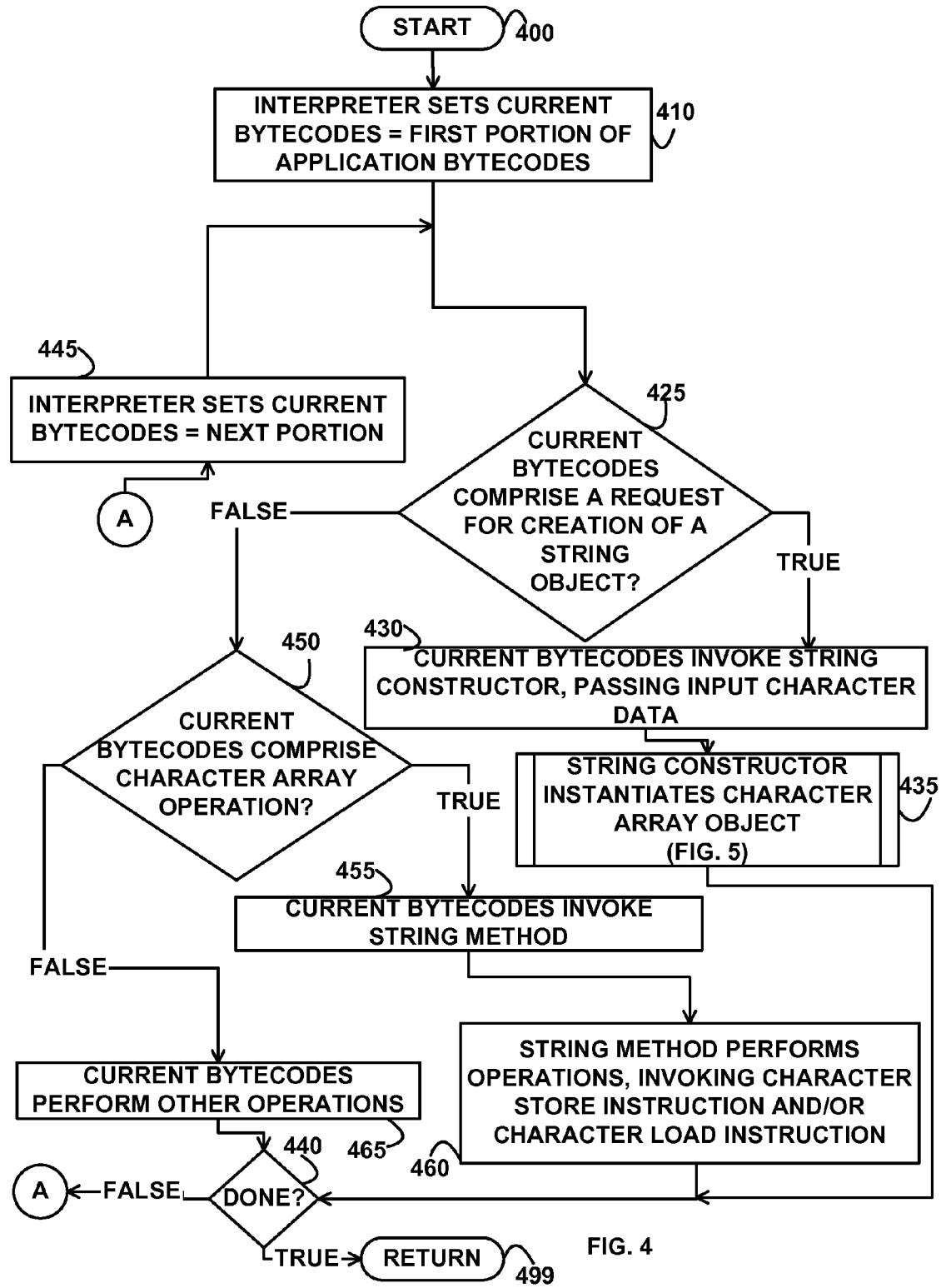
FIG. 4 depicts a flowchart of example processing for interpreting an application, according to an embodiment of the invention.

FIG. 4 depicts a flowchart of example processing for interpreting an application, according to an embodiment of the invention. Control begins at block 400.

Control then continues to block 410 where the interpreter 150 sets the current bytecodes to be the first portion of the application bytecodes 152-2. Control then continues to block 425 where the current bytecodes execute on the processor 101 (in an embodiment, as interpreted by the interpreter 150) and determine whether the current bytecodes comprise a request for creation of a string object.

If the determination at block 425 is true, then the current bytecodes comprise a request for the creation of a string object, so control continues to block 430 where the current bytecodes execute on the processor 101 (in an embodiment, as interpreted by the interpreter 150) and invoke the string constructor 210, passing the input character data 160 to the string constructor 210. Control then continues to block 435 where the string constructor 210 executes on the processor 101 and instantiates the character array object 162, as further described below with reference to FIG. 5. Control then continues to block 440 where the interpreter 150 determines whether it is done interpreting the application bytecodes 152-2.

If the determination at block 440 is true, then the interpreter 150 has interpreted all of the applications bytecodes 152-2 and is done, so control continues to block 499 where the logic of FIG. 4 returns.

If the determination at block 440 is false, then the interpreter 150 has not interpreted all of the application bytecodes 152-2 and more bytecodes remain to be interpreted, so control continues to block 445 where the interpreter 150 sets the current bytecodes to be the next portion of the applications bytecodes 152-2. Control then returns to block 425, as previously described above.

If the determination at block 425 is false, then the current bytecodes do not comprise a request for the creation of a string object, so control continues to block 450 where the current bytecodes execute on the processor 101 (in an embodiment, as interpreted by the interpreter 150) and determine whether the current bytecodes comprise a character array operation.

If the determination at block 450 is true, then the current bytecodes comprise a character array operation, so control continues to block 455 where the current bytecodes execute on the processor 101 and invoke a string method 215 (e.g., compare, concatenation, contains, find, join, left, length, partition, reverse, substring, uppercase, lowercase). Control then continues to block 460 where the string method 215 executes on the processor 101 and performs operations, invoking the character store instruction 220 and/or the character load instruction 225. Control then continues to block 440, as previously described above.

If the determination at block 450 is false, then the current bytecodes do not comprise a character array operation, so control continues to block 465 where the current bytecodes perform other operations. Control then continues to block 440, as previously described above.

Figure 5:
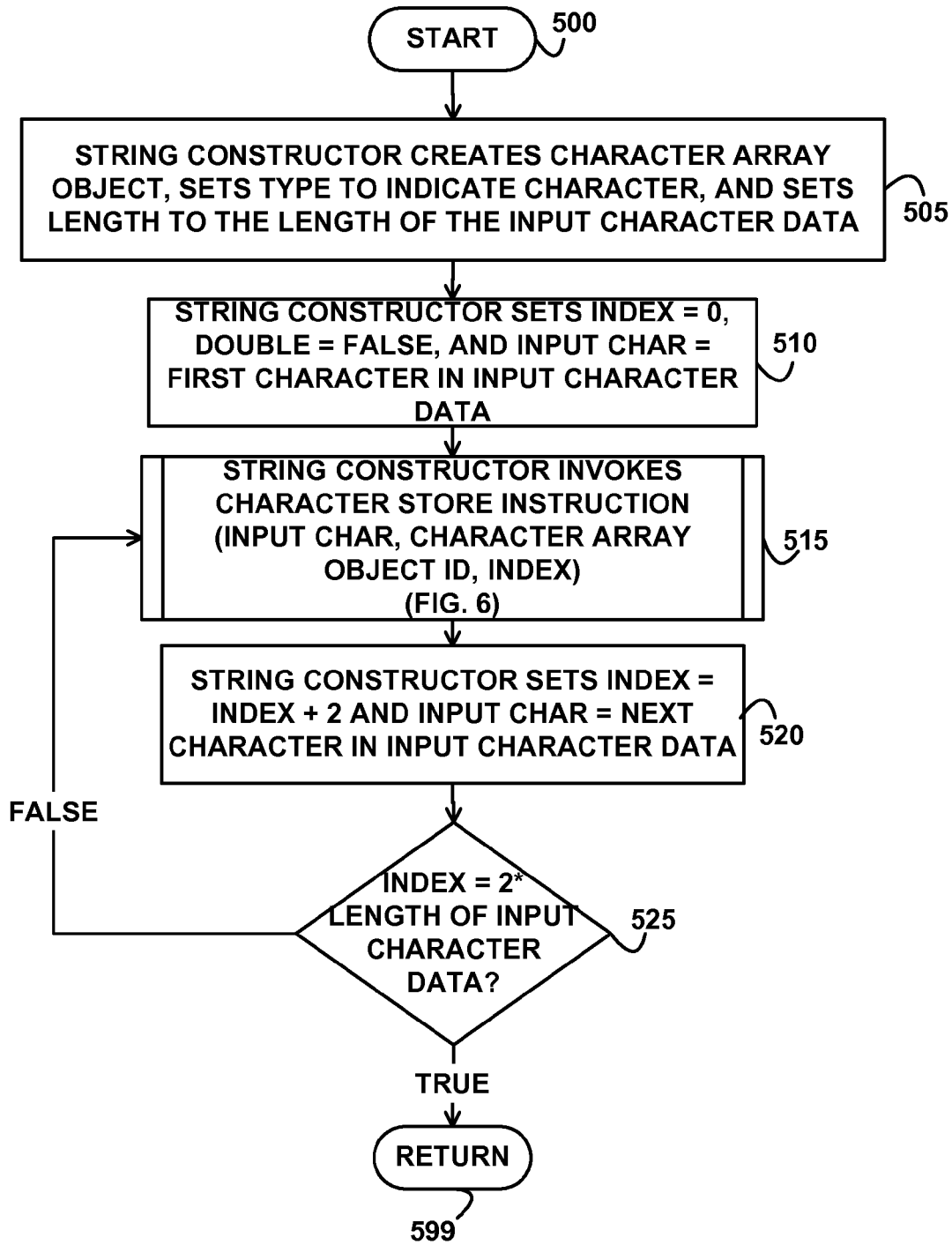
FIG. 5 depicts a flowchart of example processing for instantiating a character array object, according to an embodiment of the invention.

FIG. 5 depicts a flowchart of example processing for instantiating an object, according to an embodiment of the invention. Control begins at block 500. Control then continues to block 505 where the string constructor 210 creates the character array object 162, sets the type field 315 to indicate a character array and sets the length field 320 field to the length of the input character data 160.

Control then continues to block 510 where the string constructor 210 sets the index to be zero, sets the double field 325 to indicate false, and sets the input character to be the first character in the input character data 160. Control then continues to block 515 where the string constructor 210 invokes the character store instruction 220, passing an input character, an identifier of a character array object 162, and an index, as further described below with reference to FIG. 6. Control then continues to block 520 where the string constructor 210 sets the index to be the index plus two (the length in bytes of the character that was previously stored by the character store instruction of block 515) and sets the input character to be the next character in the input character data 160. Control then continues to block 525 where the string constructor 210 determines whether the index equals two multiplied by the length of the input character data 160.

If the determination at block 525 is true, then the index equals two multiplied by the length of the input character data 160, so control continues to block 599 where the logic of FIG. 5 returns.

If the determination at block 525 is false, then the index does not equal two multiplied by the length of the input character data 160, so control returns to block 515, as previously described above.

Figure 6:
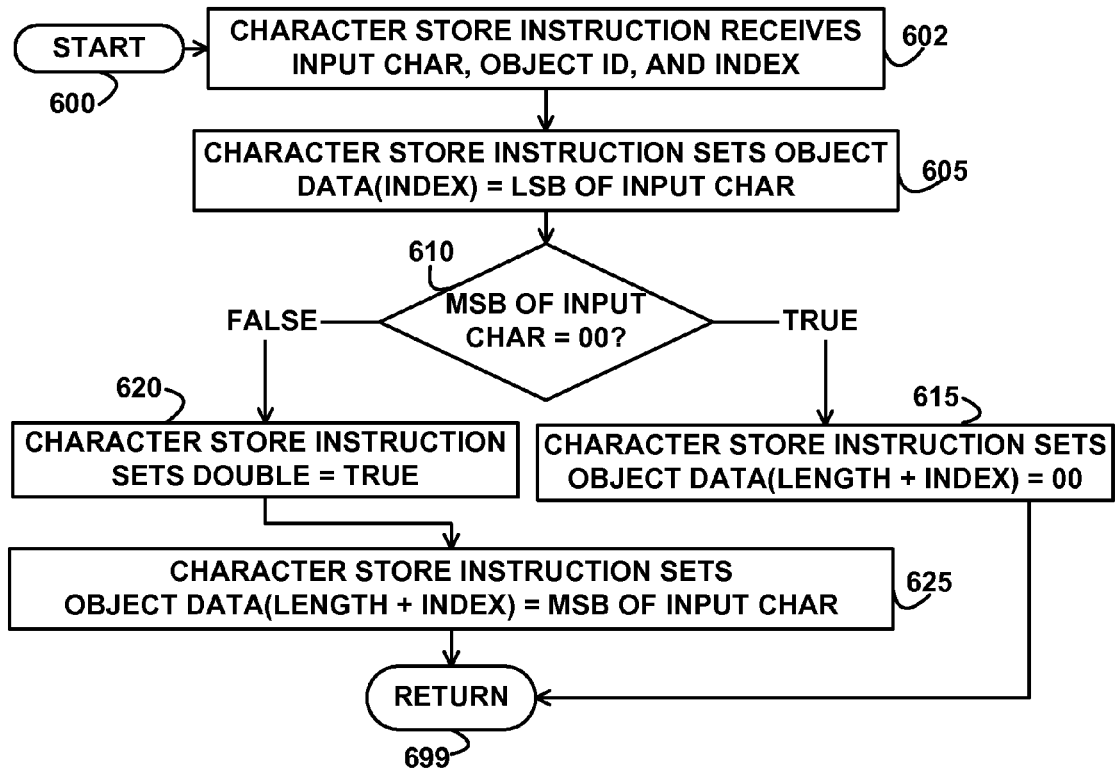
FIG. 6 depicts a flowchart of example processing for a character store instruction, according to an embodiment of the invention.

FIG. 6 depicts a flowchart of example processing for a character store instruction, according to an embodiment of the invention. Control begins at block 600. Control then continues to block 602 where the character store instruction 220 receives an input character, an object identifier, and an index from the invoker. Control then continues to block 605 where the character store instruction 220 sets object data(index) =LSB of the input character, which stores the LSB of the input character to a storage location whose address comprises the base address of the character array in the object data 310 plus the index. The base address of the character array is the address of the first byte of the object data 310, which is "0A36" in the example of FIG. 3.

Control then continues to block 610 where the character store instruction 220 determines whether the MSB of the input character equals zero (00). If the determination at block 610 is true, then the MSB of the input character equals 00, so control continues to block 615 where the character store instruction 220 sets object data (length+index) equal to 00, which stores 00 in a storage location whose address comprises the base address of the object data 310 plus the character length of the character array in the object data 310 plus the index. Control then continues to block 699 where the logic of FIG. 6 returns.

If the determination at block 610 is false, then the MSB of the input character does not equal 00, so control continues to block 620 where the character store instruction 220 sets the double field 325 to indicate true. Control then continues to block 625 where the character store instruction 220 sets object data(length plus the index) equal to the MSB of the input character. Thus, the character store instruction 220 stores the most significant byte at a storage location that comprises a base address of the object data 310 that comprises the character array plus the index plus the character length 320 of the character array. In an embodiment, the character store instruction 220 sets object data(length plus the index plus an offset) equal to the MSB of the input character, where the addition of the offset aligns the MSB of the input character on a word boundary address within the object data in the memory 102 or the cache 142. Control then continues to block 699 where the logic of FIG. 6 returns.

Figure 7:
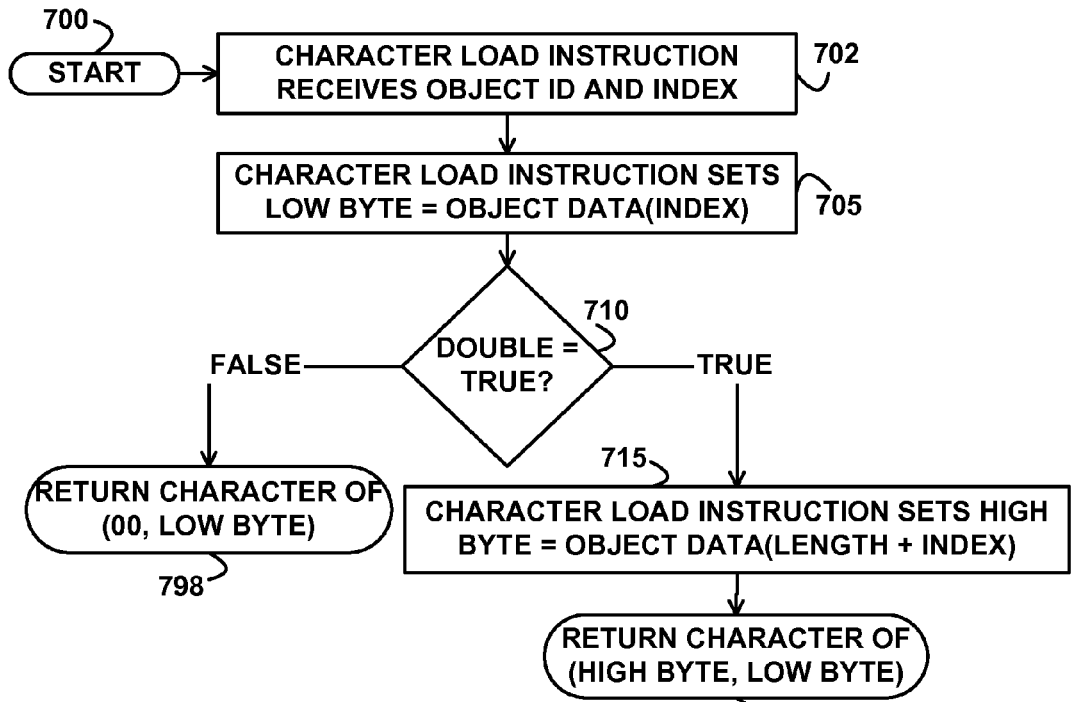
FIG. 7 depicts a flowchart of example processing for a character load instruction, according to an embodiment of the invention.

FIG. 7 depicts a flowchart of example processing for executing a character load instruction, according to an embodiment of the invention. Control begins at block 700. Control then continues to block 702 where the character load instruction 225 receives an object identifier and an index from the invoker.

Control then continues to block 705 where the character load instruction 225 sets the low byte equal to the object data(index). That is, the character load instruction 225 sets the low byte to be the byte at the storage location whose address comprises the base address of the object data 310 plus the index.

Control then continues to block 710 where the character load instruction 225 determines whether the double field 325 indicates true. If the determination at block 710 is true, then double field 325 indicates true, so control continues to block 715 where the character load instruction 225 sets the high byte equal to object data (length plus index). That is, the character load instruction 225 sets the high byte to be the byte at the storage location whose address comprises the base address of the object data 310 plus the character length 320 of the character array in the object data 310 plus the index. Control then continues to block 799 where the character load instruction 225 returns a character of (high byte, low byte) where high byte is the most significant byte of the returned character, and low byte is the least significant byte of the returned character.

If the determination at block 710 is false, then double field 325 indicates false, so control continues to block 798 where the character load instruction 225 returns a character of (00, low byte), where 00 is the most significant byte of the returned character and low byte is the least significant byte of the returned character.

Although the logic of FIGS. 6 and 7 has been described using the terminology of the object data field 310, the length field 320, and the double field 325, the CPU 140 may actually access these fields in the cache 142, as illustrated in FIG. 3.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A non-transitory computer-readable storage medium encoded with instructions, wherein the instructions when executed comprise:
setting an indicator to indicate that all of a plurality of most significant bytes of characters in a character array are zero;
receiving a first index and an input character comprising a first most significant byte and a first least significant byte;
storing the first most significant byte at a first storage location and the first least significant byte at a second storage location, wherein the first storage location and the second storage location have non-contiguous addresses, wherein the storing further comprises storing the first most significant byte at the first storage location identified by a first address that comprises a base address of the character array plus the first index plus a character length of the character array and storing the first least significant byte at the second storage location identified by a second address that comprises the base address of the character array plus the first index; and
if the first most significant byte does not equal zero, setting the indicator to indicate that at least one of a plurality of most significant bytes of the characters in the character array is non-zero, wherein the character array comprises the first most significant byte and the first least significant byte.

2. The non-transitory computer-readable storage medium of claim 1, wherein the first storage location is in a first cache line in a cache and the second storage location is in a second cache line in the cache, wherein the first cache line is different from the second cache line.

3. The non-transitory computer-readable storage medium of claim 2, wherein after the storing, contents of the first cache line are replaced in the cache and the contents of the second cache line remain in the cache.

4. The non-transitory computer-readable storage medium of claim 1, further comprising:
receiving a second index;
if the indicator indicates that all of a plurality of most significant bytes of the characters in the character array are zero, setting a returned most significant byte of a returned character to be zero;

if the indicator indicates that at least one of a plurality of most significant bytes of the characters in the character array is non-zero, setting the returned most significant byte of the returned character to be a byte from a third storage location identified by a third address that comprises a base address of the character array plus the second index plus a character length of the character array; and setting a returned least significant byte of the returned character to be a byte from a fourth storage location identified by a fourth address that comprises a base address of the character array plus the second index.

5. The non-transitory computer-readable storage medium of claim 4, wherein the third storage location is in a third cache line in the cache and the fourth storage location is in a fourth cache line in the cache, wherein the third cache line is different from the fourth cache line.

6. The non-transitory computer-readable storage medium of claim 4, wherein the third storage location is in memory and the fourth storage location is in a second cache line in the cache.

7. The non-transitory computer-readable storage medium of claim 1, wherein the storing the first most significant byte is performed by a character store instruction.

8. A computer system, comprising:
   a processor; and
   memory communicatively coupled to the processor, wherein the memory is encoded with instructions that when executed on the processor comprise:
      setting an indicator to indicate that all of a plurality of most significant bytes of characters in a character array are zero,
      receiving a first index and an input character comprising a first most significant byte and a first least significant byte,
      storing the first most significant byte at a first storage location and the first least significant byte at a second storage location, wherein the first storage location and the second storage location have non-contiguous addresses, wherein the storing further comprises storing the first most significant byte at the first storage location identified by a first address that comprises a base address of the character array plus the first index plus a character length of the character array and storing the first least significant byte at the second storage location identified by a second address that comprises the base address of the character array plus the first index, and if the first most significant byte does not equal zero, setting the indicator to indicate that at least one of a plurality of most significant bytes of the characters in the character array is non-zero, wherein the character array comprises the first most significant byte and the first least significant byte.

9. The computer system of claim 8, wherein the first storage location is in a first cache line in a cache and the second storage location is in a second cache line in the cache, wherein the first cache line is different from the second cache line.

10. The computer system of claim 9, wherein after the storing, contents of the first cache line are replaced in the cache and the contents of the second cache line remain in the cache.

11. The computer system of claim 8, wherein the instructions further comprise:
   receiving a second index;
   if the indicator indicates that all of a plurality of most significant bytes of the characters in the character array are zero, setting a returned most significant byte of a returned character to be zero;
   if the indicator indicates that at least one of a plurality of most significant bytes of the characters in the character array is non-zero, setting the returned most significant byte of the returned character to be a byte from a third storage location identified by a third address that comprises a base address of the character array plus the second index plus a character length of the character array; and
   setting a returned least significant byte of the returned character to be a byte from a fourth storage location identified by a fourth address that comprises a base address of the character array plus the second index.

12. The computer system of claim 11, wherein the third storage location is in a third cache line in the cache and the fourth storage location is in a fourth cache line in the cache, wherein the third cache line is different from the fourth cache line.

13. The computer system of claim 11, wherein the third storage location is in memory and the fourth storage location is in a second cache line in the cache.

14. The computer system of claim 8, wherein the storing the first most significant byte is performed by a character store instruction.

* * * * *